(12) United States Patent
Heisey et al.

(10) Patent No.: US 7,988,230 B2
(45) Date of Patent: Aug. 2, 2011

(54) JUVENILE VEHICLE SEAT WITH LAP BELT LOCK-OFF MECHANISM

(75) Inventors: Nathan W. Heisey, Columbus, IN (US); Curtis J. Brandl, Fishers, IN (US)

(73) Assignee: Cosco Management, Inc., Wilmington, DE (US)

( * ) Notice: Subject to any disclaimer, the term of this patent is extended or adjusted under 35 U.S.C. 154(b) by 134 days.

(21) Appl. No.: 12/360,075

(22) Filed: Jan. 26, 2009

(65) Prior Publication Data

US 2010/0187880 A1 Jul. 29, 2010

(51) Int. Cl.
*A47C 1/08* (2006.01)
(52) U.S. Cl. ............. 297/250.1; 297/256.16; 297/463.1; 297/463.2
(58) Field of Classification Search ............... 297/250.1, 297/256.16, 463.1, 463.2
See application file for complete search history.

(56) References Cited

U.S. PATENT DOCUMENTS

| | | | |
|---|---|---|---|
| 958,249 A | 5/1910 | Hirsh | |
| 1,825,016 A | 9/1931 | Salisbury | |
| 2,326,328 A | 8/1943 | Bush | |
| 3,136,579 A | 6/1964 | Hunter | |
| 3,510,151 A | 5/1970 | Weman | |
| 4,387,489 A | 6/1983 | Dudek | |
| 4,660,889 A | 4/1987 | Anthony et al. | |
| 4,681,368 A * | 7/1987 | Heath et al. | 297/216.11 |
| 4,796,919 A | 1/1989 | Linden | |
| 4,854,639 A | 8/1989 | Burleigh | |
| 5,000,481 A | 3/1991 | Wilson | |
| 5,186,520 A | 2/1993 | Whitaker | |
| 5,579,561 A | 12/1996 | Smith et al. | |
| 5,611,596 A | 3/1997 | Barley et al. | |
| 5,653,003 A | 8/1997 | Freeman | |
| 5,671,971 A * | 9/1997 | Koyanagi et al. | 297/250.1 |
| 5,845,372 A * | 12/1998 | Smith et al. | 24/168 |
| 6,000,753 A * | 12/1999 | Cone, II | 297/256.16 |
| 6,152,528 A * | 11/2000 | van Montfort | 297/250.1 |
| 6,390,562 B1 | 5/2002 | Takamizu | |
| 6,428,099 B1* | 8/2002 | Kain | 297/256.1 |
| 6,471,298 B2 | 10/2002 | Carine et al. | |
| 6,508,510 B2* | 1/2003 | Yamazaki | 297/250.1 |
| 6,672,664 B2* | 1/2004 | Yanaka et al. | 297/256.16 |
| 6,695,400 B2 | 2/2004 | Washizuka et al. | |
| 7,059,676 B2 | 6/2006 | McNeff | |
| 7,163,265 B2* | 1/2007 | Adachi | 297/256.12 |
| 7,216,932 B2* | 5/2007 | Emmert | 297/256.16 |
| 7,300,113 B2* | 11/2007 | Baloga et al. | 297/468 |
| 7,325,871 B2* | 2/2008 | Gangadharan et al. | 297/256.16 |
| 7,472,955 B2* | 1/2009 | Crane et al. | 297/256.16 |
| 7,658,446 B2* | 2/2010 | Meeker et al. | 297/250.1 |
| 2005/0110318 A1 | 5/2005 | Meeker et al. | |
| 2005/0184567 A1 | 8/2005 | Carpenter et al. | |
| 2005/0253431 A1 | 11/2005 | Hei et al. | |
| 2005/0264062 A1 | 12/2005 | Longenecker et al. | |
| 2006/0091709 A1 | 5/2006 | Emmert | |
| 2006/0261650 A1 | 11/2006 | Billman et al. | |
| 2006/0261651 A1 | 11/2006 | Nolan et al. | |
| 2007/0069060 A1 | 3/2007 | Mciejczyk | |
| 2007/0228788 A1* | 10/2007 | Meeker et al. | 297/250.1 |
| 2008/0136234 A1 | 6/2008 | Hutchinson et al. | |

* cited by examiner

*Primary Examiner* — Laurie K Cranmer
(74) *Attorney, Agent, or Firm* — Barnes & Thornburg LLP

(57) ABSTRACT

A seat support for a juvenile restraint adapted to receive a juvenile seat. The seat support includes an anchor belt retainer for anchoring a seat-base anchor belt to the seat support and for anchoring a vehicle anchor belt to the seat support.

14 Claims, 9 Drawing Sheets

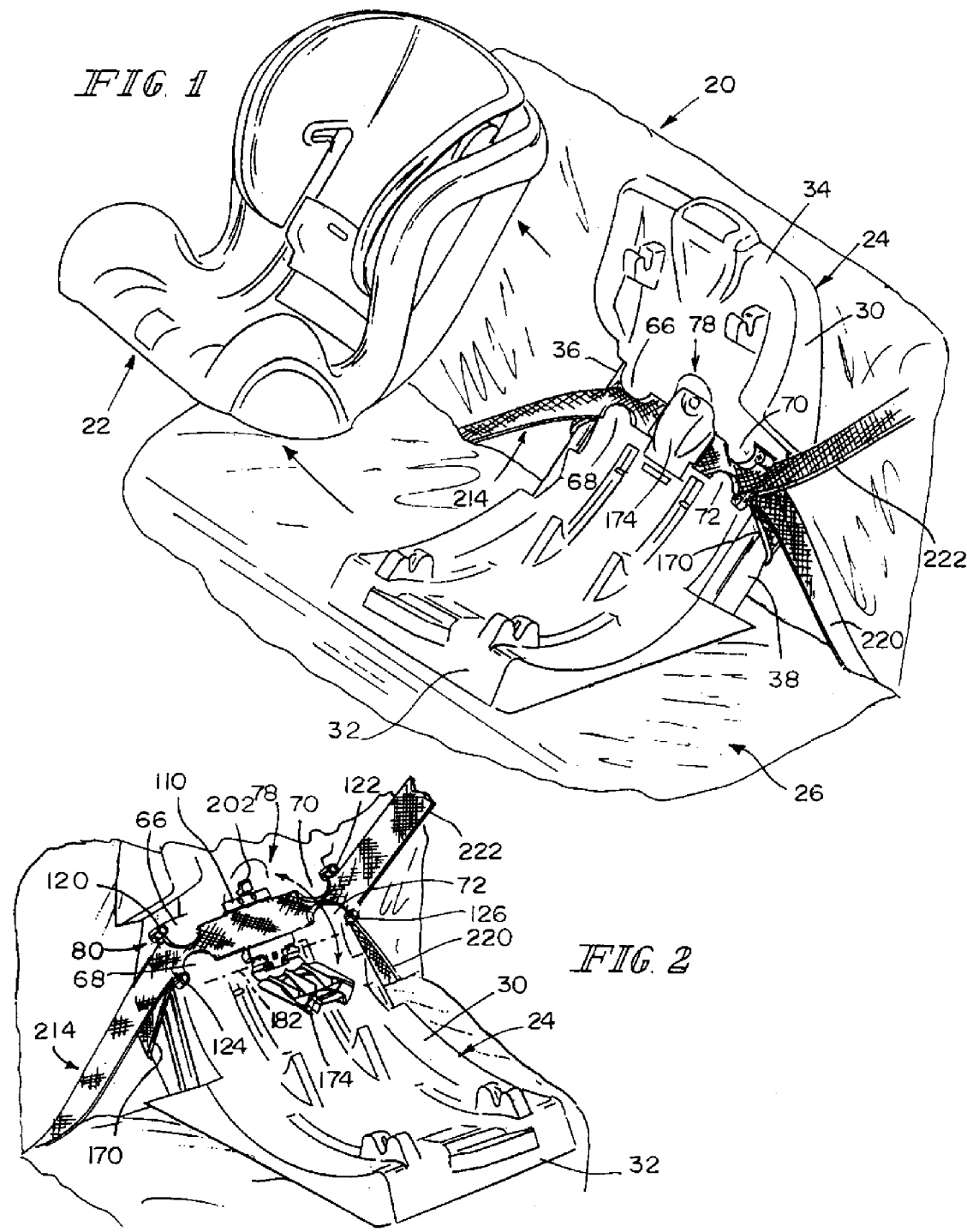

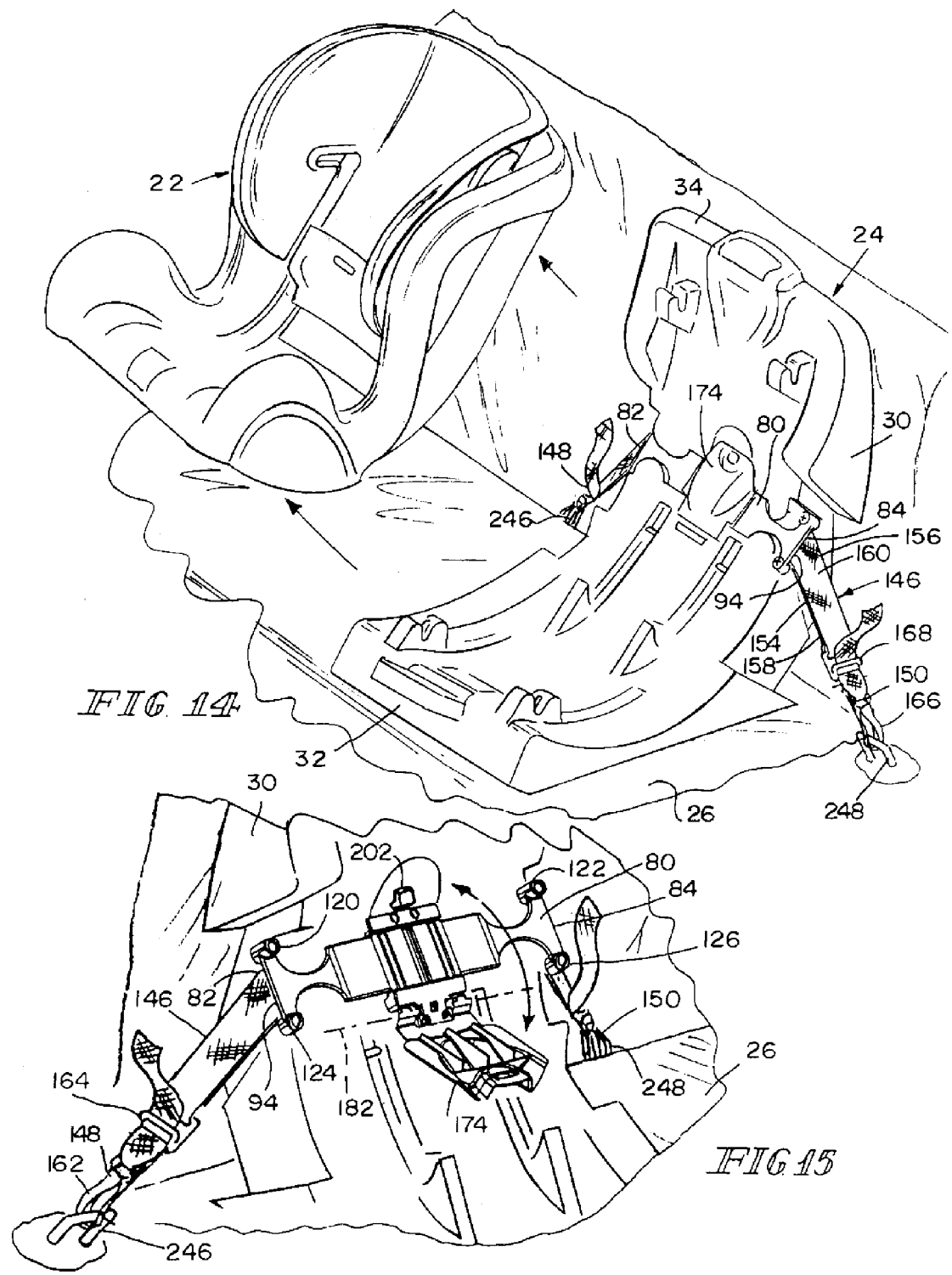

JUVENILE VEHICLE SEAT WITH LAP BELT LOCK-OFF MECHANISM

BACKGROUND

The present disclosure relates to child restraints, and particularly to an anchor belt retainer system for anchoring a seat support of the child restraint to a seat in a vehicle. More particularly, the present disclosure relates to an anchor belt retainer system for anchoring a seat-base anchor belt and a vehicle anchor belt to the seat support of a child restraint.

SUMMARY

According to the present disclosure, a child restraint includes a seat support and a juvenile seat configured to be mounted on the seat support. The seat support includes a base configured to mate with the juvenile seat and a seat-base anchor belt for anchoring the seat support to a vehicle seat.

In the illustrative embodiments, the seat support includes an anchor belt retainer for anchoring a seat-base anchor belt and a vehicle anchor belt to the seat support. The anchor belt retainer includes a seat-base anchor belt lock for anchoring the seat-base anchor belt to the base of the seat support and a vehicle anchor belt lock for anchoring the vehicle anchor belt to the base of the seat support when the seat-base anchor belt is in a stored position. The anchor belt retainer includes a belt-separator plate that separates the vehicle anchor belt from the seat-base anchor belt when the vehicle anchor belt is anchored to the base of the seat support. Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is perspective view showing a child restraint in accordance with the present disclosure including a juvenile seat, a seat support including a seat-base anchor belt shown in a stored position, an anchor belt retainer including a vehicle anchor belt lock, and a vehicle anchor belt releasably locked to the seat support by a clamping member of the vehicle anchor belt lock, with the vehicle anchor belt removably coupling the seat support to a vehicle seat;

FIG. 2 is a partial perspective view showing the seat-base anchor belt in the stored position and the seat support coupled to the vehicle seat by the vehicle anchor belt with the clamping member of the vehicle anchor belt lock in an opened position and suggesting that the clamping member is pivotable to a closed position to lock the vehicle anchor belt to the seat support;

FIG. 14 is a perspective view of the child restraint in accordance with the present disclosure showing the juvenile seat removed from the seat support and showing that the seat support is coupled to the vehicle seat by the seat-base anchor belt; and FIG. 15 is an enlarged partial perspective view of the seat support shown coupled to the vehicle seat by the seat-base anchor belt, and showing the clamping member of the vehicle anchor belt lock in the opened position and suggesting that the clamping member can be pivoted to a closed position.

DETAILED DESCRIPTION

Figure 3:
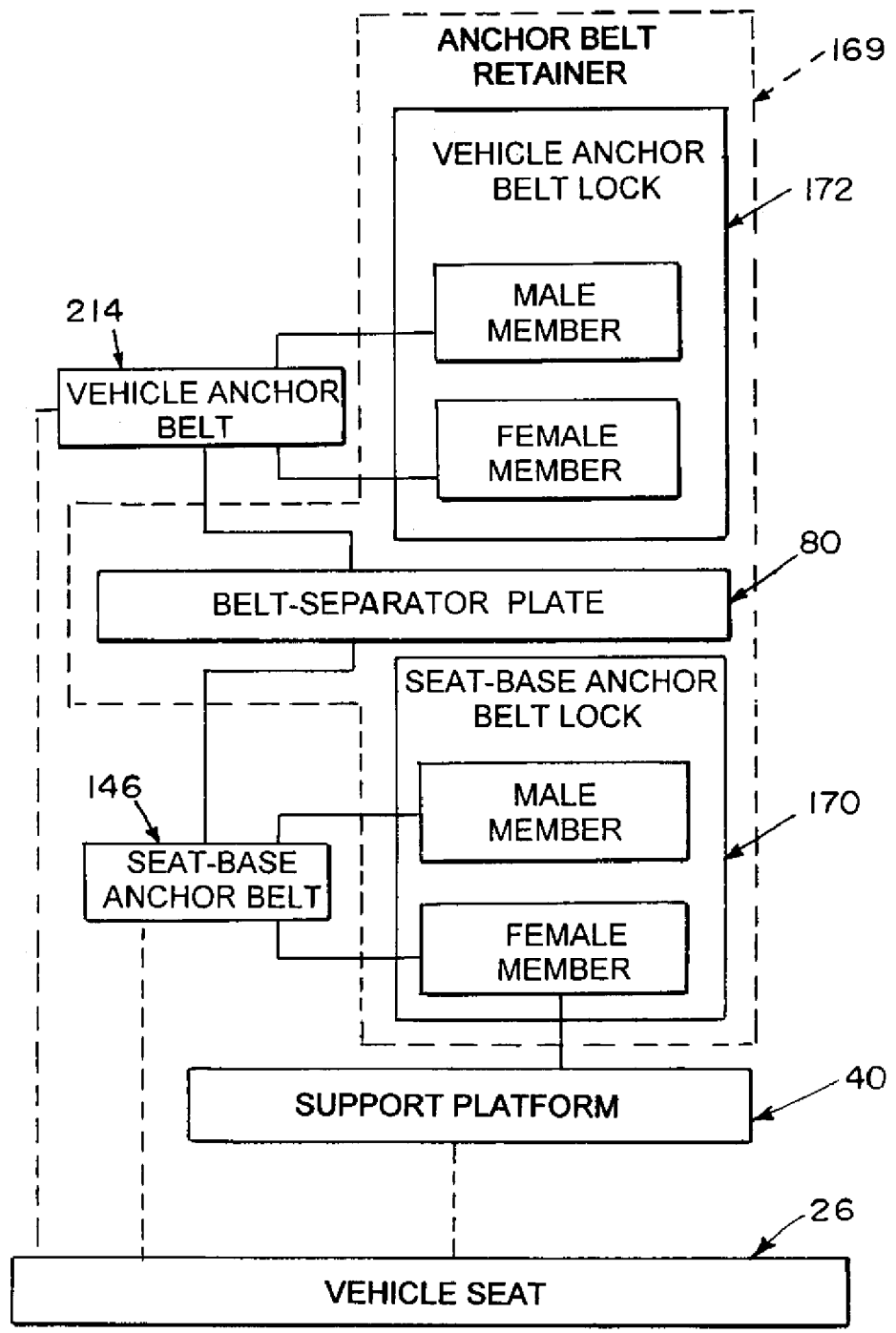
FIG. 3 is a diagrammatic view of a seat support in accordance with the present disclosure including an anchor belt retainer having a seat-base anchor belt lock with a male member and a female member for locking a seat-base anchor belt to a belt separator plate of the seat support and a vehicle anchor belt lock with a male member and a female member for releasably locking a vehicle anchor belt to a support platform of the seat support, the seat-base anchor belt and vehicle anchor belt each being configured to couple the seat support to a vehicle seat.
Figure 4:
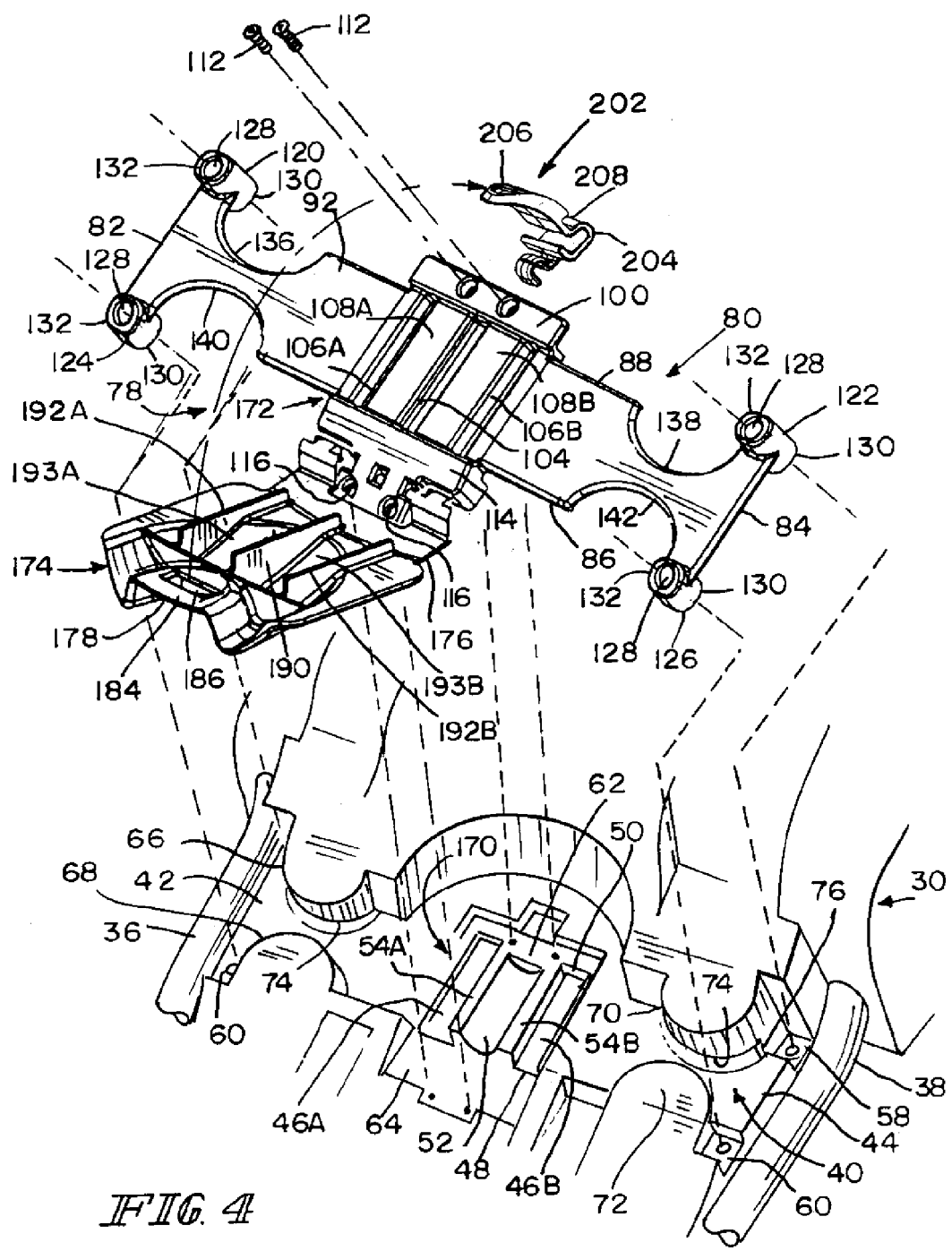
FIG. 4 is an exploded perspective view of the seat support showing the clamping member with the male member of the vehicle anchor belt lock, the belt-separator plate with the female member of the vehicle anchor belt lock, and the support platform of the seat support with the female member of the seat-base anchor belt lock, and a clasp for locking the clamping member in the closed position.
Figure 5:
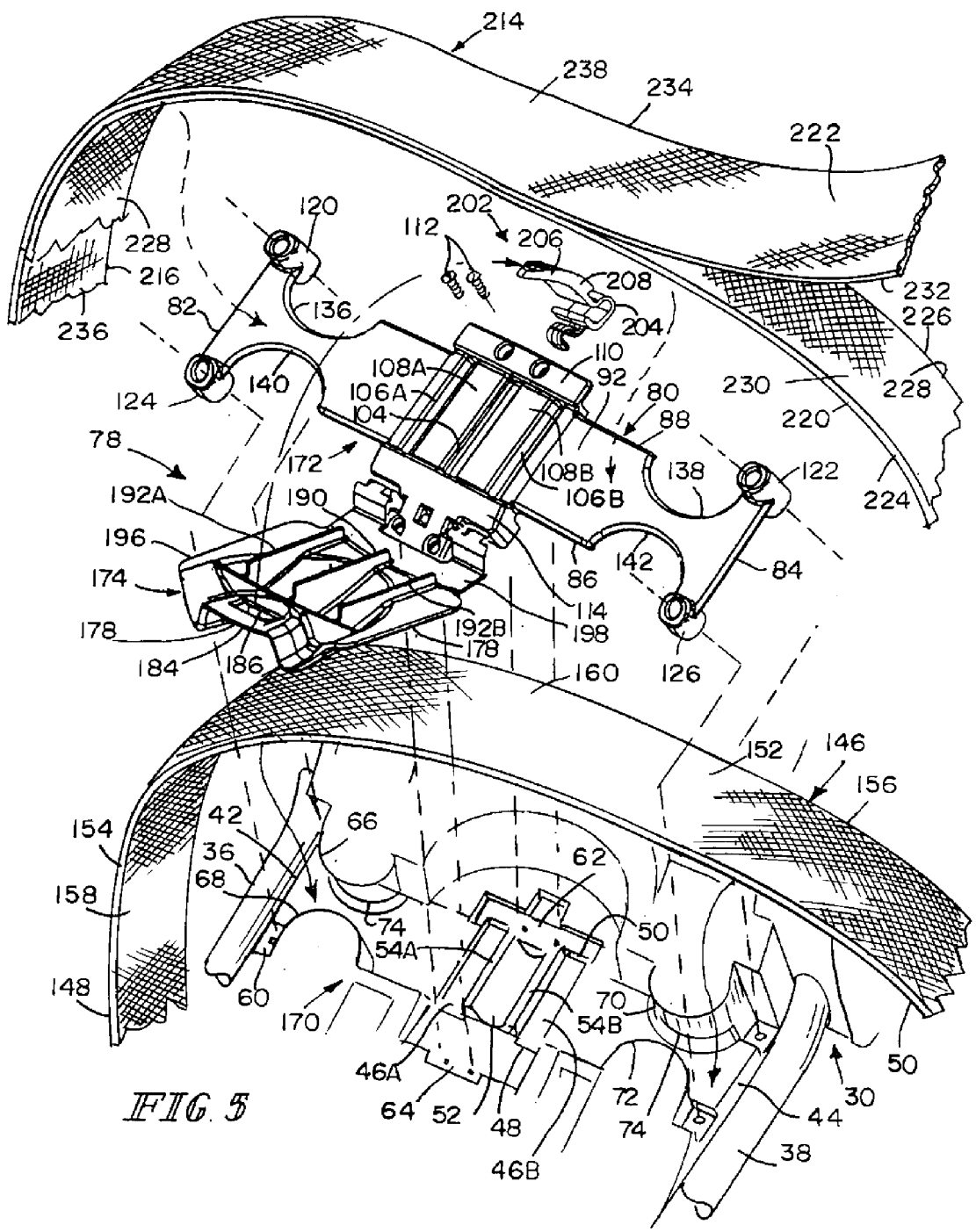
FIG. 5 is an exploded perspective view of the seat support similar to FIG. 4, but also showing the seat-base anchor belt disposed between the support platform of the seat support and the belt-separator plate, and suggesting that the vehicle anchor belt is adapted to be disposed between the belt-separator plate and the clamping member of the seat-base anchor belt lock when the clamping member is in the closed position.
Figure 6:
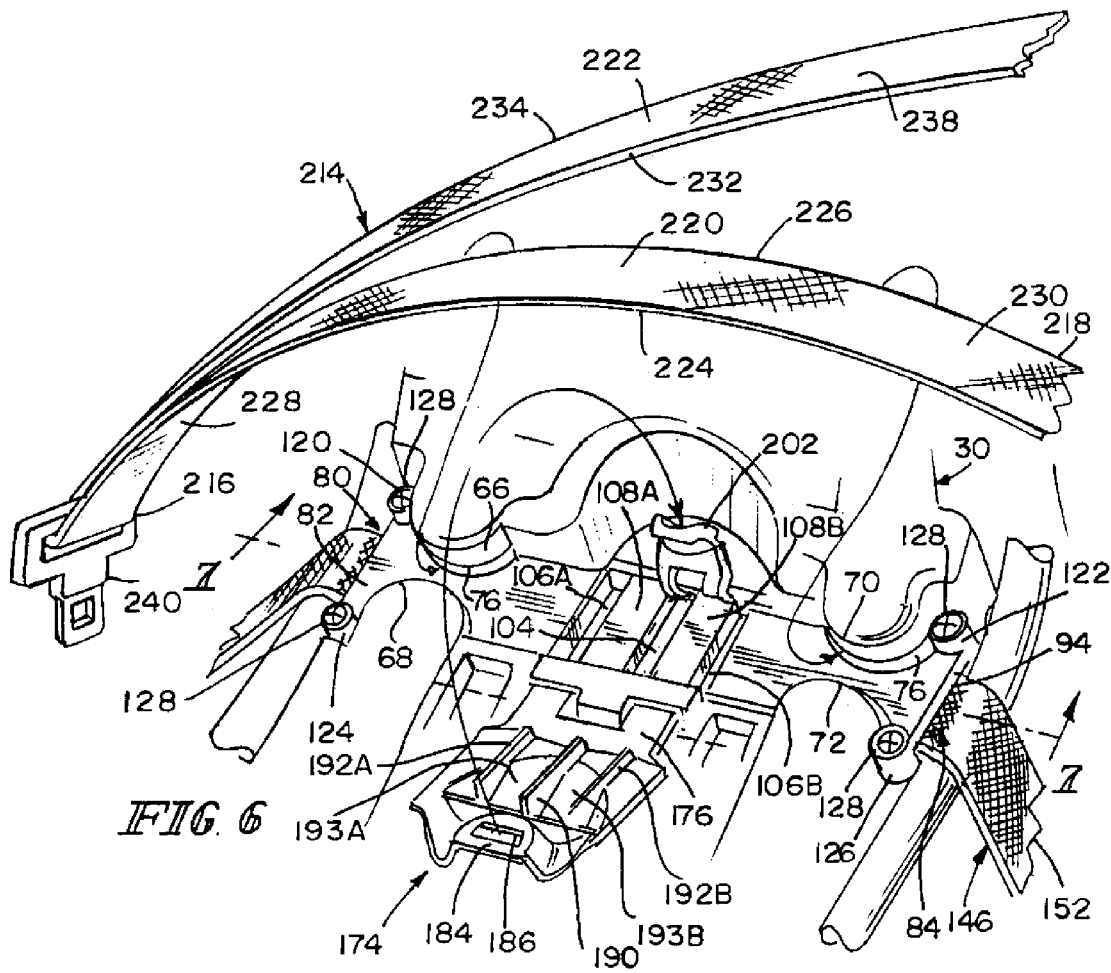
FIG. 6 is a partial perspective view of the seat support showing the seat-base anchor belt in the stored position, and the clamping member of the vehicle belt lock in an opened position such that the vehicle anchor belt is adapted to be placed across the belt-separator plate for coupling the seat support to a vehicle seat, and suggesting that the clamping member is pivotable to a closed position to lock the vehicle anchor belt to the seat support.
Figure 7:
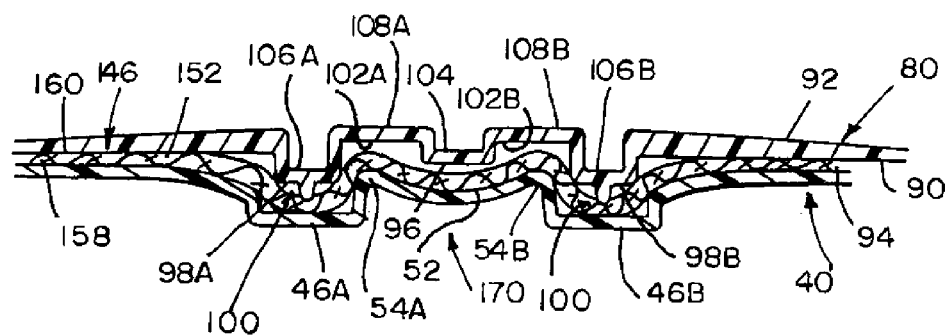
FIG. 7 is an enlarged sectional view taken generally along line 7-7 of FIG. 6 showing the seat-base anchor belt locked in place between the belt-separator plate and the support platform of the seat support by the male member and female member of the seat-base anchor belt lock, the male member of the seat-base anchor belt lock being formed as a portion of the belt-separator plate and the female member of the seat-base anchor belt lock being formed as a portion of the support platform of the seat support.

A child restraint 20 is shown in FIG. 1 including a juvenile seat 22 adapted to be removably mounted to a seat support 24. As shown in FIGS. 1 and 2, seat support 24 is adapted to set on an underlying vehicle seat 26 and is adapted to be anchored to vehicle seat 26. Seat support 24 includes a base 30 having a bottom end 32, a top end 34, a first side 36, and a second side 38. Base 30 is configured to removably receive juvenile seat 22.

Base 30 includes a support platform 40 located between bottom end 32 and top end 34 that extends generally transversely between first side 36 and second side 38. Support platform 40 includes a first end 42 located adjacent first side 36 of base 30 and a second end 44 located adjacent second side 38 of base 30.

Support platform 40 includes spaced apart and parallel elongate female members 46A-B, such as recesses, formed in the top of support platform 40. Female members 46A-B extend from a bottom end 48 to a top end 50 of support platform 40. An elongate concavely curved female member 52 is located between female members 46A and 46B and extends parallel to female members 46A-B between bottom end 48 and top end 50 of support platform 40.

Support platform 40 includes male members 54A-B, such as projections, that are respectively located on each side of female member 52. Male member 54A is located adjacent female member 46A and male member 54B is located adjacent female member 46B. Male members 54A-B are spaced apart from one another and extend generally parallel to one another between bottom end 48 and top end 50 of support platform 40 and generally parallel to female members 46A-B and 52.

Base 30 also includes an upper mounting receptacle 58 and a lower mounting receptacle 60 located at first end 42 and at second end 44 of support platform 40. Upper mounting receptacles 58 are located adjacent top end 50 and lower mounting receptacles 60 are located adjacent bottom end 48 of support platform 40. An upper central mounting receptacle 62 is located adjacent female members 46A-B and 52 and male members 54A-B at top end 50 of support platform 40. A lower central mounting receptacle 64 is located adjacent female members 46A-B and 52 and male members 54A-B at bottom end 48 of support platform 40.

Base 30 further includes a first upper vehicle belt retainer 66 and a first lower vehicle belt retainer 68 located adjacent first end 42 of support platform 40. First upper vehicle belt retainer 66 extends from top end 50 of support platform 40 toward bottom end 48. First lower vehicle belt retainer 68 extends from bottom end 48 of support platform 40 toward top end 50. First upper vehicle belt retainer 66 and first lower vehicle belt retainer 68 are located on opposite sides of support platform 40 and project toward one another with a gap formed between the distal ends of first upper vehicle belt retainer 66 and first lower vehicle belt retainer 68.

Base 30 also includes a second upper vehicle belt retainer 70 and a second lower vehicle belt retainer 72 located adjacent second end 44 of support platform 40. Second upper vehicle belt retainer 70 extends from top end 50 of support platform 40 toward bottom end 48. Second lower vehicle belt retainer 72 extends from bottom end 48 of support platform 40 toward top end 50. Second upper vehicle belt retainer 70 and second lower vehicle belt retainer 72 are located on opposite sides of support platform 40 and extend toward one another with a gap formed between the distal ends of second upper vehicle belt retainer 70 and second lower vehicle belt retainer 72. First upper vehicle belt retainer 66, first lower vehicle belt retainer 68, second upper vehicle belt retainer 70 and second lower vehicle belt retainer 72 each include a bottom 74 that is spaced apart from the top of support platform 40 and that forms a receptacle 76. Support platform 40 may include notches respectively located below first upper vehicle belt retainer 66, first lower vehicle belt retainer 68, second upper vehicle belt retainer 70, and second lower vehicle belt retainer 72.

Seat support 24 includes an anchor belt retainer 78. Anchor belt retainer 78 comprises a belt-separator plate 80 that overlies support platform 40 and that is attached to base 30 of seat support 24. Belt separator plate 80 extends between a first end 82 and a second end 84 and between a bottom end 86 and a top end 88. Belt-separator plate 80 includes a bottom 90 and a top 92. A first belt passageway 94 extends between bottom 90 of belt-separator plate 80 and the top of support platform 40 from first end 42 of support platform 40 and first end 82 of belt-separator plate 80 to second end 44 of support platform 40 and second end 84 of belt-separator plate 80.

Bottom 90 of belt-separator plate 80 is spaced apart from and above the top of support platform 40. Bottom 90 of belt-separator plate 80 includes an elongate central male member 96, such as a projection, that extends between bottom end 86 and top end 88 of belt-separator plate 80 and that extends generally parallel to and projects downwardly toward female member 52 of support platform 40.

Elongate outer male members 98A and 98B, such as projections, are respectively located on each side of central male member 96 and are spaced uniformly apart from and parallel to central male member 96. Outer male members 98A-B extend from bottom end 86 to top end 88 of belt-separator plate 80. Outer male member 98A extends generally parallel to and projects downwardly toward female member 46A of support platform 40. Outer male member 98B extends generally parallel to and projects downwardly toward female member 46B of support platform 40. Outer male members 98A-B each include a longitudinal rib 100 that extends from bottom end 86 to top end 88 of belt-separator plate 80 and that projects outwardly and downwardly toward support platform 40.

Bottom 90 of belt-separator plate 80 includes spaced apart and generally parallel female members 102A and 102B, such as recesses, that extend between bottom end 86 and top end 88 of belt-separator plate 80. Female member 102A is located between central male member 96 and outer male member 98A. Female member 102B is located between central male member 96 and outer male member 98B. Male member 54A of support platform 40 extends generally parallel to and projects upwardly toward female member 102A of belt-separator plate 80. Male member 54B of support platform 40 extends generally parallel to and projects upwardly toward female member 102B of belt-separator plate 80.

Top 92 of belt-separator plate 80 includes a central female member 104, such as a recess, that extends from bottom end 86 to top end 88 of belt-separator plate 80 and that is located on the opposite side of belt-separator plate 80 from central male member 96. Top 92 of belt-separator plate 80 also includes elongate outer female members 106A and 106B, such as recesses, that are located on opposite sides of central female member 104 and that extend generally parallel thereto and with one another between bottom end 86 and top end 88 of belt-separator plate 80. Outer female member 106A is located on the opposite side of belt-separator plate 80 from outer male member 98A, and outer female member 106B is located on the opposite of belt-separator plate 80 from outer male member 98B. Top 92 of belt-separator plate 80 includes spaced apart and generally parallel male members 108A and 108B, such as recesses, that extend between bottom end 86 and top end 88 of belt-separator plate 80 and that are located on the opposite side of belt-separator plate 80 from outer male members 98A-B. Male member 108A is located between outer female member 106A and central female member 104. Male member 108B is located between outer female member 106B and central female member 104.

A first central mounting member 110 is attached to top end 88 of belt-separator plate 80 and is configured to be coupled to base 30 by fasteners 112, such as screws or the like. A second central mounting member 114 is attached to bottom end 86 of belt-separator plate 80 and is configured to be coupled to base 30 with fasteners 116, such as screws or the like.

Belt-separator plate 80 includes a first upper mounting member 120 located adjacent first end 82 and top end 88, and a second upper mounting member 122 located adjacent second end 84 and top end 88 of belt separator plate 80. Belt-separator plate 80 also includes a first lower mounting member 124 located adjacent first end 82 and bottom end 86, and a second lower mounting member 126 located adjacent second end 84 and bottom end 86 of belt-separator plate 80. Each first upper mounting member 120, second upper mounting member 122, first lower mounting member 124, and second lower mounting member 126 extends between a bottom end 130 and a top end 132, is generally cylindrical and annular, and includes a central bore 128. Each top end 132 is spaced above top 92 of belt-separator plate 80 and each bottom end 130 is spaced below bottom 90 of belt-separator plate 80. Bottom end 130 of first upper mounting member 120 is configured to be received in upper mounting receptacle 58 at first end 42 of support platform 40, bottom end 130 of second upper mounting member 122 is configured to be received in upper mounting receptacle 58 at second end 44 of support platform 40, bottom end 130 of first lower mounting member 124 is configured to be received in lower mounting receptacle 60 at first end 42 of support platform 40, and bottom end 130 of second lower mounting member 126 is configured to be received within lower mounting receptacle 60 at second end 44 of support platform 40. Each bore 128 is adapted to receive a fastener, such as a screw or the like, for coupling belt-separator plate 80 to base 30.

Belt-separator plate 80 includes a first upper notch 136, in the general form of an arc of a circle, located at top end 88 and adjacent first end 82 of belt-separator plate 80 and aligned with first upper vehicle belt retainer 66. A second upper notch 138, in the general form of an arc of a circle, is located at top end 88 and adjacent second end 84 of belt-separator plate 80 and is aligned with second upper vehicle belt retainer 70. A first lower notch 140, in the general form of an arc of a circle, is located at bottom end 86 and adjacent first end 82 of belt-separator plate 80 and is aligned with first lower vehicle belt retainer 68. A second lower notch 142, in the general form of an arc of a circle, is located at bottom end 86 and adjacent second end 84 of belt-separator plate 80 and is aligned with second lower vehicle belt retainer 72. First upper notch 136 is configured to receive first upper vehicle belt retainer 66, second upper notch 138 is configured to receive second upper vehicle belt retainer 70, first lower notch 140 is configured to receive first lower vehicle belt retainer 68, and second lower notch 142 is configured to receive second lower vehicle belt retainer 72, when belt-separator plate 80 is assembled to base 30 in a position adjacent and overlying support platform 40. Top 92 of belt-separator plate 80 is located below bottoms 74 of first upper vehicle belt retainer 66, first lower vehicle belt retainer 68, second upper vehicle belt retainer 70, and second lower vehicle belt retainer 72 thereby providing access to receptacles 76 from above top 90 of belt-separator plate 80.

Seat support 24 includes a lower-anchors-and-tethers-for-children (LATCH) system comprising a seat-base anchor belt 146 extending between a first end 148 and a second end 150. Seat-base anchor belt 146 comprises a flexible strap 152 having a bottom edge 154, a spaced apart and generally parallel top edge 156, a bottom surface 158 and a top surface 160. Seat-base anchor belt 146 extends through first belt passageway 94 between support platform 40 and bottom 90 of belt-separator plate 80, with first end 148 of seat-base anchor belt 146 extending outwardly from first end 42 of support platform 40 and first end 82 of belt-separator plate 80, and second end 150 of seat-base anchor belt 146 extending outwardly from second end 44 of support platform 40 and second end 84 of belt-separator plate 80. An anchor member such as a first anchor hook 162, or other suitable connector, is attached to strap 152 at first end 148. A first adjustment mechanism 164 is attached to strap 152 adjacent first end 148 for selectively adjusting the length of strap 152 and the distance first anchor hook 162 is located from first end 82 of belt-separator plate 80. An anchor member such as a second anchor hook 166, or other suitable connector, is attached to strap 152 at second end 150. A second adjustment mechanism 168 is attached to strap 152 adjacent second end 150 for selectively adjusting the length of strap 152 and the distance second anchor hook 166 is located from second end 84 of belt-separator plate 80.

Anchor belt retainer 78 further comprises a seat-base anchor belt lock 170 and a vehicle anchor belt lock 172. Seat-base anchor belt lock 170 comprises female members 46A-B, female member 52 and male members 54A-B of support platform 40, and central male member 96, outer male members 98A-B and female members 102A-B of bottom 90 of belt-separator plate 80. Outer male member 98A and rib 100 of seat-base anchor belt lock 170 are configured to press strap 152 of seat-base anchor belt 146 into female member 46A and into engagement with support platform 40. Outer male member 98B and rib 100 are configured to press strap 152 into female member 46B and into engagement with support platform 40. Central male member 96 is configured to press strap 152 into female member 52 and into engagement with support platform 40. Male member 54A is configured to press strap 152 into female member 102A and into engagement with belt-separator plate 80. Male member 54B is configured to press strap 152 into female member 102B and into engagement with belt-separator plate 80. Seat-base anchor belt lock 170 thereby anchors and locks strap 152 of seat-base anchor belt 146 to support platform 40 and belt-separator plate 80 such that strap 152 will not slide longitudinally with respect to support platform 40 or belt-separator plate 80. Seat-base anchor belt lock 170 is configured to permanently lock strap 152 in place between support platform 40 and belt-separator plate 80. As shown in FIGS. 1 and 2, first end 148 and second end 150 of seat-base anchor belt 146 may be stored behind the back of seat support 24 when not in use by removably coupling first anchor hook 162 and second anchor hook 166 to one or more coupler members located on the back of seat support 24.

Vehicle anchor belt lock 172 comprises central female member 104, outer female members 106A-B and male members 108A-B of top 92 of belt-separator plate 80, and a clamping member 174. Clamping member 174 includes a first end 176 and a second end 178. First end 176 of clamping member 174 is pivotably coupled to second central mounting member 114 with a cylindrical shaft 180 such that clamping member 174 is selectively pivotable about an axis 182 of shaft 180 between a closed position and an open position. Second end 178 of clamping member 174 includes a clasp receiver 184 and an adjacent aperture 186. Clamping member 174 also includes a central male member 190, such as an elongate rib, and outer male members 192A and 192B, such as elongate ribs, respectively located on each side of and generally parallel to central male member 190. Central male member 190 and outer male members 192A-B extend from adjacent first end 176 toward second end 178 of clamping member 174. Clamping member 174 includes female members 193A and 193B, such as recesses. Female member 193A is located between outer male member 192A and central male member 190. Female member 193B is located between central male member 190 and outer male member 192B.

When clamping member 174 is in the closed position, central male member 190 extends along and overlies central female member 104 of belt-separator plate 80, outer male member 192A extends along and overlies outer female member 106A of belt-separator plate 80, outer male member 192B extends along and overlies outer female member 106B of belt-separator plate 80, female member 193A extends along and overlies male member 108A of belt-separator plate 80, and female member 193B extends along and overlies male member 108B of belt-separator plate 80. When clamping member 174 is in the closed position, a second belt passageway 194 extends between a first side 196 and a second side 198 of clamping member 174 between top 92 of belt-separator plate 80 and the bottom of clamping member 174.

Figure 12:
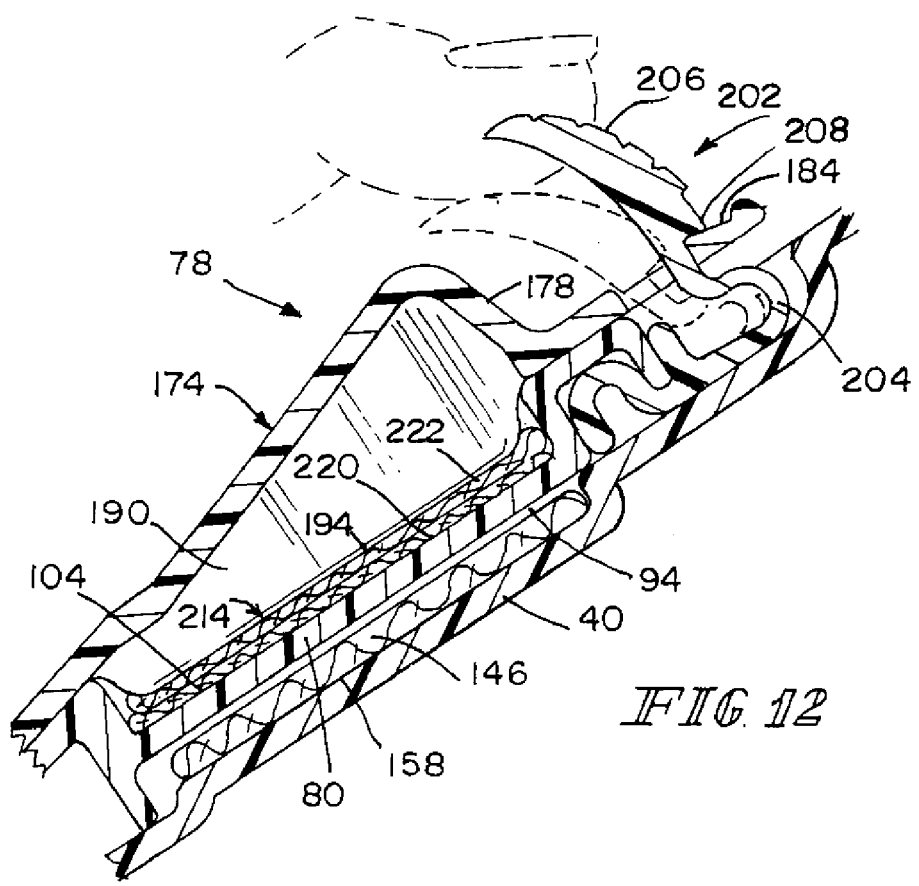
FIG. 12 is a sectional view taken generally along line 12-12 of FIG. 10 and FIG. 11 showing the clamping member of the vehicle anchor belt lock in a closed and locked position with the vehicle anchor belt locked between the clamping member and the belt-separator plate, and suggesting movement of a clasp from a lock position to a release position wherein the clamping member may be pivoted to the opened position to release the vehicle anchor belt from the locked condition.
Figure 13:
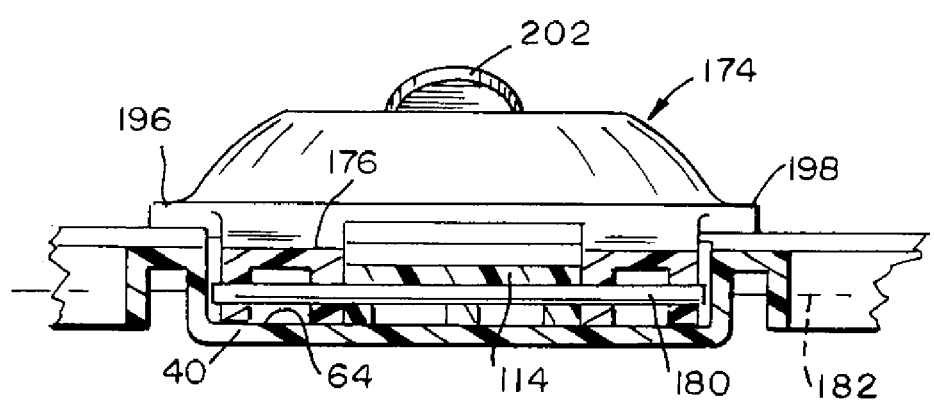
FIG. 13 is a sectional view taken generally along line 13-13 of FIG. 10 showing the clamping member of the vehicle anchor belt lock in the closed position and showing a mounting member pivotably coupling the clamping member to the support platform of the seat support.

Vehicle anchor belt lock 172 also includes a clasp 202 having a base 204 coupled to first central mounting member 110, a distal tab 206, and a detent 208. Tab 206 is resiliently and flexibly attached to base 204. When clamping member 174 is in the closed position, as shown in FIG. 12, clasp 202 will extend through aperture 186 in clamping member 174 and detent 208 will engage clasp receiver 184 of clamping member 174 to lock clamping member 174 in the closed position. Manually pressing downwardly on tab 206 pivots detent 208 out of engagement with clasp receiver 184 of clamping member 174 such that clamping member 174 may be pivoted from the closed position toward the open position.

A vehicle anchor belt 214 of the vehicle is shown in FIGS. 1 and 2 anchoring seat support 24 to vehicle seat 26, with seat-base anchor belt 146 in the stored position. Vehicle anchor belt 214 extends between a first end 216 and a second end 218. Vehicle anchor belt 214 includes a flexible lap strap 220 and a flexible shoulder strap 222 that are connected to one another at first end 216. Shoulder strap 222 is adapted to overlie lap strap 220. Alternatively, vehicle anchor belt 214 may only include lap strap 220. Lap strap 220 includes a bottom edge 224, a top edge 226, a bottom surface 228 and a top surface 230. Shoulder strap 222 includes a bottom edge 232, a top edge 234, a bottom surface 236 and a top surface 238. Vehicle anchor belt 214 includes a connector member 240 at first end 216 for coupling to a receptacle of a vehicle.

Figure 8:
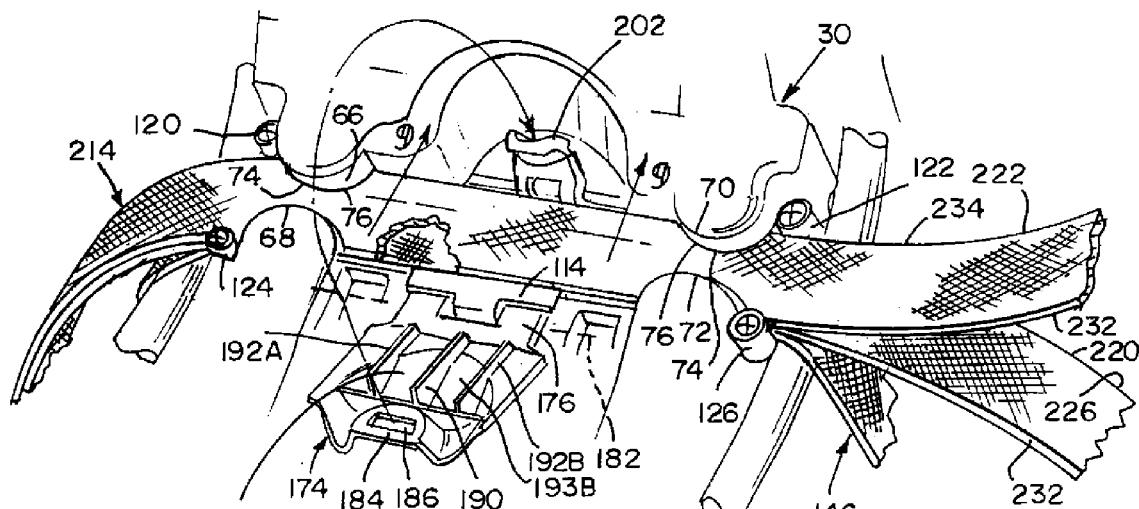
FIG. 8 is a partial perspective view of the seat support showing the seat-base anchor belt in the stored position and the clamping member of the vehicle anchor belt lock in the open position, with the vehicle anchor belt extending across the belt-separator plate of the seat support in an unlocked condition, and suggesting that the clamping member is pivotable to a closed position to lock the vehicle anchor belt to the seat support.
Figure 9:
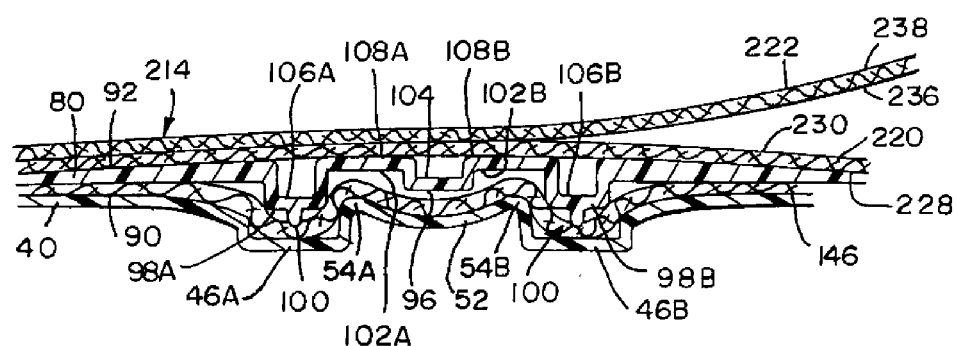
FIG. 9 is a sectional view taken generally along line 9-9 of FIG. 8 showing the seat-base anchor belt locked to the support platform of the seat support by the male member and female member of the seat-base anchor belt lock as shown in FIG. 7, and showing the vehicle anchor belt extending across the top of the belt-separator plate prior to being locked to the belt-separator plate by the clamping member.

When seat-base anchor belt 146 is in the stored position, vehicle anchor belt 214 may be used to anchor seat support 24 to vehicle seat 26. Clamping member 174 is moved to the open position as shown in FIG. 8, and vehicle anchor belt 214 is placed across top 92 of belt-separator plate 80 with first end 216 extending outwardly from first end 82 of belt-separator plate 80 and second end 218 extending outwardly from second end 84 of belt-separator plate 80. Bottom surface 228 of lap strap 220 is in engagement with top 92 of belt-separator plate 80 and is spaced apart from seat-base anchor belt 146 by belt-separator plate 80. Bottom surface 236 of shoulder strap 222 is in engagement with top surface 230 of lap strap 220. Belt separator plate 80 separates vehicle anchor belt 214 from seat-base anchor belt 146 along belt-separator plate 80 from first end 82 to second end 84 of belt-separator plate 80 thereby preventing abrasion to vehicle anchor belt 214 or seat-base anchor belt 146 that may otherwise occur if vehicle anchor belt 214 was in contact with seat-base anchor belt 146.

Top edges 226 and 234 of vehicle anchor belt 214 are located adjacent first upper mounting member 120 and second upper mounting member 122 of belt-separator plate 80. Bottom edges 224 and 232 of vehicle anchor belt 214 are located adjacent first lower mounting member 124 and second lower mounting member 126 of belt-separator plate 80. Top edges 226 and 234 of vehicle anchor belt 214 underlie bottoms 74 of first upper vehicle belt retainer 66 and second upper vehicle belt retainer 70 and within receptacles 76 of first upper vehicle belt retainer 66 and second upper vehicle belt retainer 70. Bottom edge 224 and bottom edge 232 of vehicle anchor belt 214 are located adjacent first lower mounting member 124 and second lower mounting member 126 of belt-separator plate 80. Bottom edges 224 and 232 of vehicle anchor belt 214 underlie bottoms 74, and are located within receptacles 76, of first lower vehicle belt retainer 68 and second lower vehicle belt retainer 72. Vehicle anchor belt 214 thereby extends between first upper mounting member 120 and second lower mounting member 124, and between second upper mounting member 122 and second lower mounting member 126. First upper vehicle belt retainer 66, first lower vehicle belt retainer 68, second upper vehicle belt retainer 70 and second lower vehicle belt retainer 72 are adapted to removably retain an edge of vehicle anchor belt 214.

Figure 10:
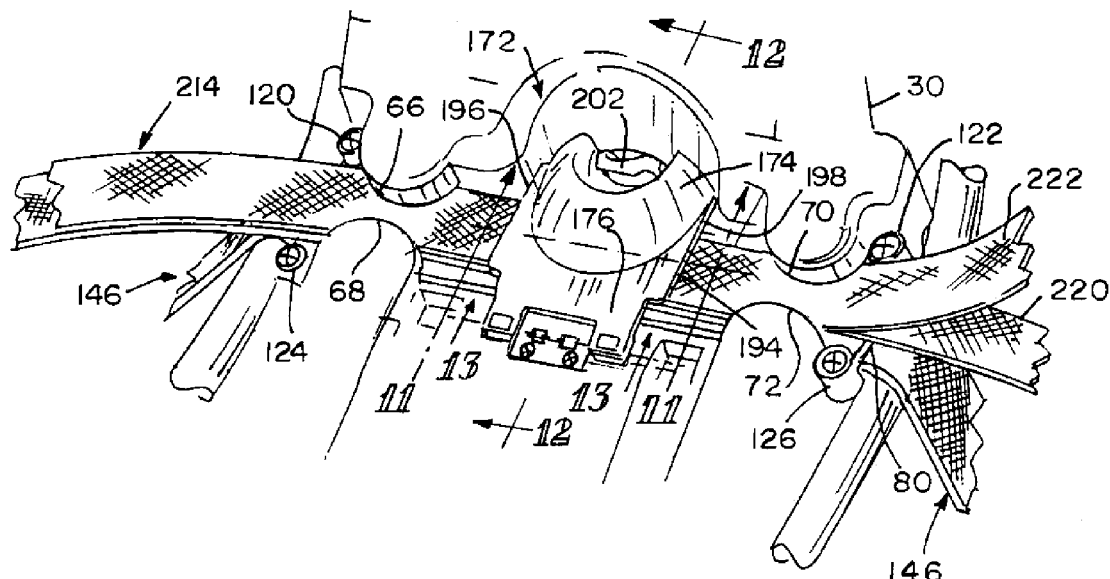
FIG. 10 is a partial perspective view of the seat support showing the seat-base anchor belt in the stored position, and the vehicle anchor belt extending across the top of the belt-separator plate with the clamping member of the vehicle anchor belt lock in the closed position to lock the vehicle anchor belt in place with respect to the belt-separator plate of the seat support.
Figure 11:
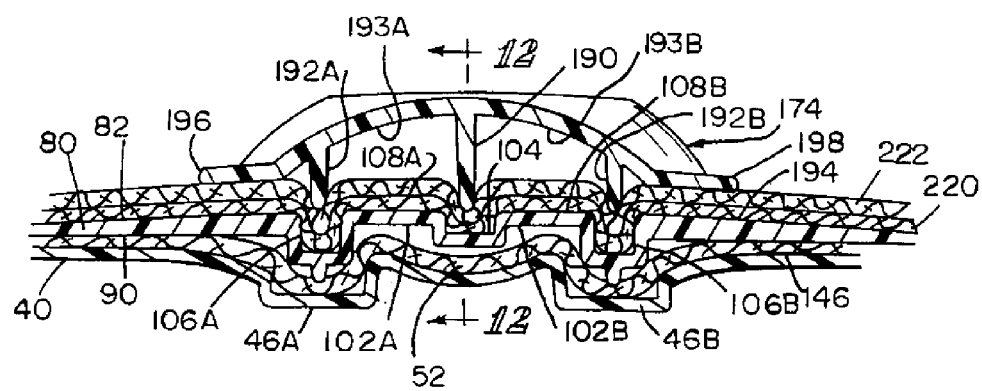
FIG. 11 is a sectional view taken generally along line 11-11 of FIG. 10 showing the seat-base anchor belt in the stored position and locked to the seat support by the seat-base anchor belt lock between the belt-separator plate and the support platform of the seat support, and showing the vehicle anchor belt locked to the seat support by the vehicle anchor belt lock between the clamping member and the belt-separator plate.

When clamping member 174 is pivoted to the closed and locked position as shown in FIGS. 10 and 11, vehicle anchor belt 214 extends through second belt passageway 194 and outwardly from first side 196 and second side 198 of clamping member 174. Central male member 190 of clamping member 174 presses vehicle anchor belt 214 into central female member 104 and into engagement with top 92 of belt-separator plate 80. Outer male member 192A presses vehicle anchor belt 214 into outer female member 106A and into engagement with top 92 of belt-separator plate 80. Outer male member 192B presses vehicle anchor belt 214 into outer female member 106B and into engagement with top 92 of belt-separator plate 80. Male member 108A of belt-separator plate 80 presses vehicle anchor belt 214 into female member 193A of clamping member 174, and male member 108B of belt-separator plate 80 presses vehicle anchor belt 214 into female member 193B of clamping member 174. Clamping member 174 thereby locks vehicle anchor belt 214 to belt-separator plate 80 when clamping member 174 is in the closed and locked position, thereby preventing longitudinal movement of vehicle anchor belt 214 with respect to clamping member 174 and belt-separator plate 80.

Seat support 24 may be anchored to vehicle seat 26 with seat-base anchor belt 146, without use of vehicle anchor belt 214, as shown in FIGS. 14 and 15. First anchor hook 162 of seat-base anchor belt 146 at first end 148 is coupled to a first stationary fixture 246, that is associated with vehicle seat 26 and that is stationarily mounted to the vehicle. Second anchor hook 166 of seat-base anchor belt 146 at second end 150 is coupled to a second stationary fixture 248 that is associated with vehicle seat 26 and that is stationarily mounted to the vehicle. First stationary fixture 246 and second stationary fixture 248 may, for example, each comprise a generally U-shaped bracket. First adjustment mechanism 164 may then be used to selectively adjust the distance at which first anchor hook 162 is located from first end 82 of belt-separator plate 80, and second adjustment mechanism 168 may be used to adjust the distance at which second anchor hook 166 is located from second end 84 of belt-separator plate 80, such that seat-base anchor belt 146 securely anchors seat support 24 to vehicle seat 26.

The invention claimed is:

1. A seat support for a juvenile restraint adapted to receive a juvenile seat, the seat support comprising
   a base including a support platform, the support platform having a first end and a second end,
   a seat-base anchor belt having a first end and a second end, the seat-base anchor belt overlying the support platform from the first end of the support platform to the second end of the support platform, the first end of the seat-base anchor belt being located outwardly from the first end of the support platform and the second end of the seat-base anchor belt being located outwardly from the second end of the support platform,
   anchor belt retainer means for locking the seat-base anchor belt to the base and for selectively locking a vehicle anchor belt of a vehicle to the base with the vehicle anchor belt spaced apart from the seat-base anchor belt,
   wherein the anchor belt retainer means comprises a belt-separator plate having a first end and a second end, the belt-separator plate overlies the seat-base anchor belt and the support platform, the first end of the belt-separator plate is located adjacent to the first end of the support platform, the second end of the belt-separator plate is located adjacent to the second end of the support platform, and the seat-base anchor belt extends through a belt passageway formed between the support platform and the belt-separator plate,
   wherein the anchor belt retainer means further comprises a seat-base anchor belt lock configured to lock the seat-base anchor belt to the support platform, and
   wherein the seat-base anchor belt lock comprises one or more male members formed in the belt-separator plate and one or more female members formed in the support platform and each male member is configured to press the seat-base anchor belt into a female member of the support platform.

2. The seat support of claim 1, wherein the belt-separator plate includes a top and a bottom, the bottom of the belt-separator plate forms the belt passageway, the vehicle anchor belt is adapted to extend across the top of the belt-separator plate from the first end of the belt-separator plate to the second end of the belt-separator plate, and the belt-separator plate separates the vehicle anchor belt from the seat-base anchor belt between the first and second ends of the belt-separator plate.

3. The seat support of claim 1, wherein the anchor belt retainer means further comprises a vehicle anchor belt lock adapted to selectively lock the vehicle anchor belt to the belt-separator plate.

4. The seat support of claim 3, wherein the vehicle anchor belt lock includes a clamping member selectively pivotable between a closed position and an opened position and the clamping member is configured to lock the vehicle anchor belt to the belt-separator plate when the vehicle anchor belt extends across the belt-separator plate and the clamping member is in the closed position.

5. The seat support of claim 3, wherein the vehicle anchor belt lock includes one or more female members formed in the belt-separator plate and one or more male members and each male member is configured to press the vehicle anchor belt into a female member of the belt-separator plate to thereby lock the vehicle anchor belt to the belt-separator plate.

6. The seat support of claim 1, wherein the anchor belt retainer means comprises a vehicle anchor belt lock including a clamping member selectively pivotable between a closed position and an opened position and the clamping member is configured to lock the vehicle anchor belt to the base when the clamping member is in the closed position.

7. The seat support of claim 6, wherein the clamping member includes one or more outwardly projecting male members adapted to engage the vehicle anchor belt when the clamping member is in the closed position.

8. The seat support of claim 6, wherein the vehicle anchor belt lock includes a clasp, the clamping member includes a first end pivotably coupled to the base and a second end including a clasp receiver, and the clasp is configured to releasably engage the clasp receiver to lock the clamping member in the closed position.

9. The seat support of claim 1, wherein the anchor belt retainer means comprises a belt-separator plate overlying the support platform from the first end to the second end of the support platform, the support platform and the belt-separator plate forming a belt passageway through which the seat-base anchor belt extends, and a clamping member having a first end pivotably coupled to the belt-separator plate and a second end, the clamping member being selectively pivotable between a closed position and an open position, the clamping member adapted to lock the vehicle anchor belt to the belt-separator plate when the clamping member is in the closed position.

10. A seat support for a juvenile restraint adapted to receive a juvenile seat, the seat support comprising
    a base including a support platform, the support platform having a first end and a second end,
    a seat-base anchor belt having a first end and a second end, the seat-base anchor belt overlying the support platform from the first end of the support platform to the second end of the support platform, the first end of the seat-base anchor belt being located outwardly from the first end of the support platform and the second end of the seat-base anchor belt being located outwardly from the second end of the support platform,
    anchor belt retainer means for locking the seat-base anchor belt to the base and for selectively locking a vehicle anchor belt of a vehicle to the base with the vehicle anchor belt spaced apart from the seat-base anchor belt,
    wherein the anchor belt retainer means comprises a belt-separator plate having a first end and a second end, the belt-separator plate overlies the seat-base anchor belt and the support platform, the first end of the belt-separator plate is located adjacent scent to the first end of the support platform, the second end of the belt-separator plate is located adjacent to the second end of the support platform, and the seat-base anchor belt extends through a belt passageway formed between the support platform and the belt-separator plate,
    wherein the anchor belt retainer means further comprises a seat-base anchor belt lock configured to lock the seat-base anchor belt to the support platform, and
    wherein the seat-base anchor belt lock comprises one or more female members formed in the belt-separator plate and one or more male members formed in the support platform and each male member is configured to press the seat-base anchor belt into a female member of the belt-separator plate.

11. A seat support for a juvenile restraint adapted to receive a juvenile seat, the seat support comprising
a base including a support platform, the support platform having a first end and second end,
a seat-base anchor belt having a first end and a second end, the seat-base anchor belt overlying the support platform from the first end of the support platform to the second end of the support platform, the first end of the seat-base anchor belt being located outwardly from the first end of the support platform and the second end of the seat-base anchor belt being located outwardly from the second end of the support platform,
anchor belt retainer means for locking the seat-base anchor belt to the base and for selectively locking a vehicle anchor belt of a vehicle to the base with the vehicle anchor belt spaced apart from the seat-base anchor belt,
wherein the anchor belt retainer means comprises a belt-separator plate overlying the support platform from the first end to the second end of the support platform, the support platform and the belt-separator plate forming a belt passageway through which the seat-base anchor belt extends, and a clamping member having a first end pivotably coupled to the belt-separator plate and a second end, the clamping member being selectively pivotable between a closed position and an open position the clamping member adapted to lock the vehicle anchor belt to the belt-separator plate when the clamping member is in the closed position, and
further comprising a first upper vehicle anchor belt retainer and a first lower vehicle anchor belt retainer at the first end of the support platform, and a second upper vehicle anchor belt retainer and a second lower vehicle anchor belt retainer at the second end of the support platform, each of the vehicle anchor belt retainers being adapted to removably retain an edge of the vehicle anchor belt.

12. The seat support of claim 11, wherein the belt-separator plate includes a first upper notch aligned with the first upper vehicle anchor belt retainer, a first lower notch aligned with the first lower vehicle anchor belt retainer, a second upper notch aligned with the second upper vehicle anchor belt retainer, and a second lower notch aligned with the second lower anchor belt retainer.

13. A seat support for a juvenile restraint adapted to receive a juvenile seat, the seat support comprising
a base including a support platform, the support platform having a first end and a second end,
a seat-base anchor belt having a first end and a second end, the seat-base anchor belt overlying the support platform from the first end of the support platform to the second end of the support platform, the first end of the seat-base anchor belt being located outwardly from the first end of the support platform and the second end of the seat-base anchor belt being located outwardly from the second end of the support platform,
anchor belt retainer means for locking the seat-base anchor belt to the base and for selectively locking a vehicle anchor belt of a vehicle to the base with the vehicle anchor belt spaced apart from the seat-base anchor belt,
wherein the anchor belt retainer means comprises a belt-separator plate overlying, the support platform from the first end to the second end of the support platform, the support platform and the belt-separator plate forming a belt passageway through which the seat-base anchor belt extends, and a clamping member having a first end pivotably coupled to the belt-separator plate and a second end, the clamping member being selectively pivotable between a closed position and an open position, the clamping member adapted to lock the vehicle anchor belt to the belt-separator plate when the clamping member is in the closed position, and
wherein the belt-separator plate includes a first upper mounting member and a first lower mounting member at the first end of the belt-separator plate, and a second upper mounting member and a second lower mounting at the second end of the belt-separator plate, the seat-base anchor belt being located between the first upper mounting member and the first lower mounting member and between the second upper mounting member and the second lower mounting member, the vehicle anchor belt adapted to be located between the first upper mounting member and the first lower mounting member and between the second upper mounting member and the second lower mounting member when the vehicle anchor belt extends across the belt-separator plate.

14. A seat support for a juvenile restraint adapted to receive a juvenile seat, the seat support comprising
a base including a support platform, the support platform including a first end, a second end and one or more female members,
a belt-separator plate overlying the support platform from the first end to the second end of the support platform, the belt-separator plate including a first end, a second end, a top, and a bottom, the bottom of the belt-separator plate and the support platform forming a first belt passageway therebetween, the first belt passageway extending from the first end of the support platform to the second end of the support platform, the bottom of the belt-separator plate including one or more male members, the top of the belt-separator plate including one or more female members,
a seat-base anchor belt having a first end and a second end, the seat-base anchor belt extending through the first belt passageway with the first end of the seat-base anchor belt located outwardly from the first end of the support platform and the second end of the seat-anchor belt located outwardly from the second end of the support platform, the male members of the belt-separator plate being configured to press the seat-base anchor belt into the female members of the support platform to thereby lock the seat-base anchor belt to the base, and
a clamping member pivotably coupled to the base for pivotable movement between a closed position and an opened position, the clamping member forming a second belt passageway between the clamping member and the top of the belt-separator plate when the clamping member is in the closed position, the second belt passageway adapted to receive a vehicle anchor belt, the clamping member including one or more male members adapted to press the vehicle anchor belt into the female members of the belt-separator plate when the clamping member is in the closed position and the vehicle anchor belt is located in the second belt passageway to thereby lock the vehicle anchor belt to the base.

* * * * *